US012320318B2

(12) United States Patent
Rainer et al.

(10) Patent No.: US 12,320,318 B2
(45) Date of Patent: Jun. 3, 2025

(54) COMBUSTION ENGINE

(71) Applicant: INNIO Jenbacher GmbH & Co OG, Jenbach (AT)

(72) Inventors: Mario Rainer, Innsbruck (AT); Andreas Huber, Hart im Zillertal (AT); Stefan Koberl, Axams (AT); Herbert Schaumberger, Muenster (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/419,451

(22) Filed: Jan. 22, 2024

(65) Prior Publication Data

US 2024/0247625 A1 Jul. 25, 2024

(51) Int. Cl.
*F02M 15/00* (2006.01)
*F02M 31/04* (2006.01)
*F02M 31/20* (2006.01)

(52) U.S. Cl.
CPC .......... *F02M 31/205* (2013.01); *F02M 31/04* (2013.01)

(58) Field of Classification Search
CPC ................. F02D 35/027; F02D 19/022; F02D 2200/0414; F02B 29/0412; F02B 19/1052; F02B 19/12
USPC .......................................................... 123/540
See application file for complete search history.

(56) References Cited

U.S. PATENT DOCUMENTS 10,794,302 B2 * 10/2020 Spyra .................. F02D 13/0269
11,549,939 B2 * 1/2023 Beike ................... C12Q 1/6834
2010/0100300 A1 * 4/2010 Brooks ............... F02B 29/0412 290/31
2015/0057911 A1 * 2/2015 Wooldridge .......... F02D 41/107 701/108
2015/0090222 A1 * 4/2015 Rebinsky ............ F02D 41/0027 123/435
2018/0252171 A1 9/2018 Spyra et al.
2018/0291833 A1 * 10/2018 Sukegawa ............... F02D 41/34
2023/0167762 A1 * 6/2023 Spyra .................. F02B 19/1028 123/258

FOREIGN PATENT DOCUMENTS

EP 3308006 A1 4/2018
EP 4060171 A1 9/2022
JP 4256767 B2 4/2009
WO WO-2014054081 A1 * 4/2014 ............. F02D 19/02

OTHER PUBLICATIONS

Extended European Search Report of EP Application No. 23152907.4, dated Aug. 16, 2023; 10 pages.
Canadian Office Action of CA Application No. 3,226,346, dated Feb. 25, 2025, 4 pgs.

* cited by examiner

*Primary Examiner* — Long T Tran
*Assistant Examiner* — James J Kim
(74) *Attorney, Agent, or Firm* — Fletcher Yoder, P.C.

(57) ABSTRACT

A combustion engine for combustion of an air-fuel mixture containing air and fuel, comprising at least one temperature adjusting means for cooling or heating the air, fuel, and/or air-fuel mixture and a control unit configured to determine the methane number and/or hydrogen content of the fuel and/or air-fuel mixture, wherein the control unit is configured to control a temperature of the air, fuel and/or air-fuel mixture based on the determined methane number and/or hydrogen content by controlling the at least one temperature adjusting means.

20 Claims, 3 Drawing Sheets

COMBUSTION ENGINE

CROSS-REFERENCE TO RELATED APPLICATION

This application claims priority to and benefit of European Application No. EP23152907, filed on Jan. 23, 2023, entitled "COMBUSTION ENGINE", which is herein incorporated by reference in its entirety.

BACKGROUND

The invention relates to a combustion engine.

The invention further relates to a method for operation of such combustion engines and to a computer program product applicable therewith.

This kind of combustion engine, also referred to as internal combustion engine, generates mechanical power by combusting an air-fuel mixture, for instance to drive a generator.

A well-known problem of said combustion engines is knock. A common strategy to address knock, as for instance presented in EP 3308006 A1, is to apply knock control methods, where knock sensors are used to detect knock ad-hoc and where detected knock triggers the alteration of certain engine parameters to move the operation point away from the knock resistance or to shift the knock resistance, particularly to increase the knock resistance. An increased or high knock resistance corresponds to a decreased or low likeliness of knock to occur, i.e., knock probability. Common ways to shift or alter the knock resistance is to lag ignition or to reduce the engine's load or rotational speed.

The main downside of such approaches is that knock must occur, particularly at harmful levels, for at least a short period of time for the control methods to function. Thus, the knock occurring can still harm the combustion engine—if not rapidly, at least over time. This is particularly harmful when fuels or gases with low methane numbers are supplied, wherein the methane number is an indicator for the speed and efficiency of the combustion.

Alternatively, and disadvantageously, the combustion engine can be derated to avoid knock.

BRIEF DESCRIPTION

Certain embodiments of the present invention provide a combustion engine which overcomes the deficiencies of the prior art, particularly one which avoids knock or allows to decrease the knock probability to desired, particularly low, levels during permanently efficient engine operation.

These embodiments are attained by a combustion engine with the features set forth in the claims. Correspondingly, certain embodiments of the invention provide a method for operation of such a combustion engine as set forth in the claims, and a computer program product as set forth in the claims.

These embodiments of the invention are based on some of the key parameters that affect the occurrence of knock: the temperature of the fuel or air-fuel mixture and the fuel's methane number and/or hydrogen content. Generally, the likeliness or probability of knock decreases with higher methane numbers, lower hydrogen contents as well as lower temperatures, particularly inside the combustion chamber.

The main advantage of embodiments of the invention and its corresponding method and computer program product is that knock can be avoided and/or controlled by means of temperature control without having to alter the fuel's composition, particularly without having to adapt parameters that affect the methane number and/or the hydrogen content, and/or without having to alter any other parameters (except of the temperature) that affect the knock resistance and/or knock probability.

The knock resistance is preferably to be understood as the ability of a fuel and/or air fuel mixture not to self-ignite and burn during compression and to prevent knock, respectively.

The knock probability is preferably to be understood as the likelihood of knock to occur. A high knock resistance, thus, corresponds to a low knock probability.

The knock resistance may be represented by a numerical value (kr) ranging between 0 and 1, wherein 0 corresponds to a fuel and/or air-fuel mixture that easily self-ignites, and wherein 1 corresponds to a fuel and/or air-fuel mixture that does not self-ignite at all.

Correspondingly, the knock probability may be represented by a numerical value (kp) ranging between 0 and 1, wherein 0 corresponds to a fuel and/or air-fuel mixture that does not self-ignite at all, and wherein 1 corresponds to a fuel and/or air-fuel mixture that easily self-ignites.

This may imply that $kp=1-kr$ and $kr=1-kp$, respectively.

With embodiments of the present invention, the knock resistance and/or probability can be shifted and/or precisely controlled, so that the combustion engine operates knock-free or with a desired knock probability throughout, particularly to avoid any uncontrolled, harmful and/or heavy knock.

In some cases, it can be desirable to operate the combustion engine knock-free; in other cases, it can be advantageous to operate the combustion engine with a desired knock probability, particularly with a low probability and/or slight knock. In some cases, slight knock can be advantageous for the combustion and/or efficiency of the engine.

The disclosed embodiments of the invention allow precise control of the knock resistance or probability, even when parameters of the fuel, such as its composition, methane number and/or hydrogen content, vary over time. This feature is key to decouple the combustion engine's efficiency of the supplied fuel, which is particularly useful for natural gas as fuel and/or when hydrogen is present in the fuel and/or mixed to the fuel.

A corresponding advantage of embodiments of the invention is that the combustion engine can be operated at constant and/or full load and/or rotational speed even with relatively low and/or varying methane numbers and/or high hydrogen contents.

Due to lower temperatures of the air, fuel and/or air-fuel mixture, the combustion engine can be kept in full load operation as long as other boundary conditions allow it, even when the methane number is low and/or the hydrogen content is high.

This means that with lower temperatures of the air, fuel and/or air-fuel mixture at low methane numbers and/or high hydrogen contents, derating of the combustion engine starts later compared to a setup with constant temperatures of the air, fuel and/or air-fuel mixture.

In some situations, the temperature of the air, fuel and/or air-fuel mixture can be increased by means of the temperature adjusting means, particularly to optimize and/or increase the efficiency of the combustion engine.

Overall, the combustion engine can be operated efficiently throughout or at least for a longer period of time. Compared to common combustion engines, the proposed combustion engine provides a higher thermal efficiency and an increased flexibility in terms of fuel composition and/or quality, wherein the latter is for instance represented by the methane number and/or hydrogen content.

Advantageous embodiments of the invention and its temperature control mechanism are recited in the appendant claims.

A particularly advantageous embodiment of the invention is that the control unit is configured to control the temperature of the air, fuel and/or air-fuel mixture if required and/or in real-time, so that the combustion engine can be operated in a knock-free regime or with a desired knock probability, even when the quality, i.e., the methane number and/or hydrogen content, of the fuel varies.

In a particularly advantageous embodiment of the invention, the control unit is configured to control the at least one temperature adjusting means to cool or heat the air, fuel and/or air-fuel mixture before the air and/or fuel and/or air-fuel mixture enters a combustion chamber of the combustion engine.

The temperature adjusting means causes the cooling or heating, i.e., the temperature control mechanism, by means of a cooling or heating medium and/or fluid and/or by thermal conduction and/or thermal convection and/or thermal radiation.

In a particularly preferred variant, the at least one temperature adjusting means comprises at least one charge air or intercooler and/or at least one fluid circuit with temperature adjusting fluid for cooling or heating, wherein the temperature adjusting fluid can be air and/or water.

In a particularly advantageous embodiment of the invention, the control unit is configured to shift an actual knock resistance towards a target knock resistance, preferably actively in or close to real-time.

This means that the target knock resistance is further away from the operation point of the combustion engine than the actual knock resistance in order to provide a knock-free engine operation regime or a regime with a desired, particularly low, knock probability.

The temperature control is preferably only applied if required, i.e., when the engine's operation point or regime moves near or reaches the actual knock resistance.

In a preferred variant, the control unit is configured to control the temperature of the air, fuel and/or air-fuel mixture, preferably by real-time adjustments, so that the combustion engine operates knock-free or with a desired knock probability at constant and/or full load and/or rotational speed.

This means that the control unit is configured to maintain a distance between the actual knock resistance and an actual operation point, which can for instance be characterized by a pressure in the combustion chamber and/or an ignition angle, by actively controlling the temperature of the air, fuel and/or air-fuel mixture by means of the at least one temperature adjusting means.

The fuel can contain hydrogen, H2 and/or methane, etc. Components can also be added to the fuel and/or air-fuel mixture.

In a preferred variant, the combustion engine comprises at least one sensor configured to obtain the methane number, i.e., a methane number sensor which directly provides the methane number of a fuel and/or air-fuel mixture as a signal.

In a preferred variant, the combustion engine comprises at least one sensor configured to sense the hydrogen content of a fuel and/or air-fuel mixture.

If the hydrogen content of a fuel and/or air-fuel mixture is obtained by at least one sensor, the methane number can be determined by means of the obtained hydrogen content.

The calculation or derivation of the methane number by means of the hydrogen content and/or natural gas content is common knowledge.

In a particularly advantageous variant, the combustion engine comprises at least one sensor configured to sense

- physical parameters such as the temperature and/or humidity of the air, fuel and/or air-fuel mixture, and/or chemical parameters of the air, fuel and/or air-fuel mixture, and/or
- a composition of the air, fuel and/or air-fuel mixture, and/or
- knock and generates data thereof.

The at least one sensor may also detect parameters regarding the combustion engine, such as the temperature of components of the combustion engine, e.g., the combustion chamber, fluid circuit, etc.

The at least one sensor may also detect parameters regarding the fuel's composition, such as the content of water, which can for instance be used to determine the quality and/or stability of the fuel.

In a particularly advantageous variant, the control unit is configured to process the data generated by the at least one sensor, for instance to derive at least one quality parameter of the air, fuel and/or air-fuel mixture, e.g., the methane number and/or hydrogen content.

The data generated by the at least one sensor may be stored and/or processed in or close to real-time.

In a preferred variant, the combustion engine is a stationary engine, which is for instance used to drive a generator for electricity generation.

In a preferred variant of the combustion engine, the combustion engine is a reciprocating engine.

In general, the combustion engine comprises all parts that are required for its operation, such as injector valves, spark plugs, pistons, piston cylinders, compression means such as turbo or super chargers, cooling or heating sources and/or exhaust gas systems.

In a preferred variant of the claimed method, the method comprises the determination and/or calculation of an actual knock resistance of the fuel and/or air-fuel mixture.

The determination of a knock resistance can for instance be performed by means of models, maps, diagrams, zones or the like and/or tests at a test facility, wherein the models, maps, diagrams, zones etc. and/or test facilities can vary depending on the engine.

In a preferred variant of the claimed method, the method comprises the determination and/or calculation of a target knock resistance and/or knock probability of the fuel and/or air-fuel mixture.

In a preferred variant of the claimed method, the method comprises the determination and/or calculation of a target temperature and/or a target temperature difference of the air, fuel and/or air-fuel mixture, so that the actual knock resistance and/or actual knock probability equals and/or turns into the target knock resistance and/or target knock probability, for instance wherein models, maps, diagrams, zones or the like representing the target knock resistance and/or target knock probability are used for the calculation and/or derivation.

In a preferred variant of the claimed method, the method comprises conditioning of the actual temperature by cooling or heating the air, fuel and/or air-fuel mixture to reach the target temperature and/or target temperature difference by means of the at least one temperature adjusting means and/or control of other parameters concerning the combustion engine, such as the compression rate of the air-fuel mixture, the temperature of the combustion chamber, the geometry of the combustion chamber, a combustion engine power and/or an ignition timing.

The computer program product provides instructions causing an executing computer to receive or read data and/or to receive measurement values.

Data refers to data comprising a methane number and/or hydrogen content of the fuel and/or air-fuel mixture.

Measurement values can be data generated by a sensor and refer to values that are used to determine and/or calculate the methane number and/or hydrogen content of the fuel and/or air-fuel mixture.

Data and/or measurement values can be stored in a storage and/or be input manually and/or be provided by a sensor with or without passing a storage or the like.

In a preferred variant of the claimed computer program product, the computer program product comprises the following instructions for an executing computer to perform:

- computation and/or utilization of a methane number and/or hydrogen content of a given fuel and/or air-fuel mixture and/or combustion engine,
- determination of an actual knock resistance based on the fuel and/or methane number and/or hydrogen content,
- setting of a target knock resistance for a combustion engine, preferably based on a target operation point which is, e.g., represented by a target load and/or rotational speed, and
- a check of whether the target knock resistance equals the actual knock resistance, and if the actual knock resistance differs from the target knock resistance, derivation of a target temperature and/or temperature difference of the air, fuel and/or air-fuel mixture, which is required to shift the actual knock resistance to the target knock resistance.

The computer program product is mainly intended for operation of a combustion engine to which it is linked to.

It is also possible to use the computer program product as a stand-alone product, e.g., in combination with a simulation and/or model of a combustion engine.

BRIEF DESCRIPTION OF THE DRAWINGS

Further details and advantages of the present invention will be described by means of the figures and their specific description hereinafter, wherein.

DETAILED DESCRIPTION

Figure 1:
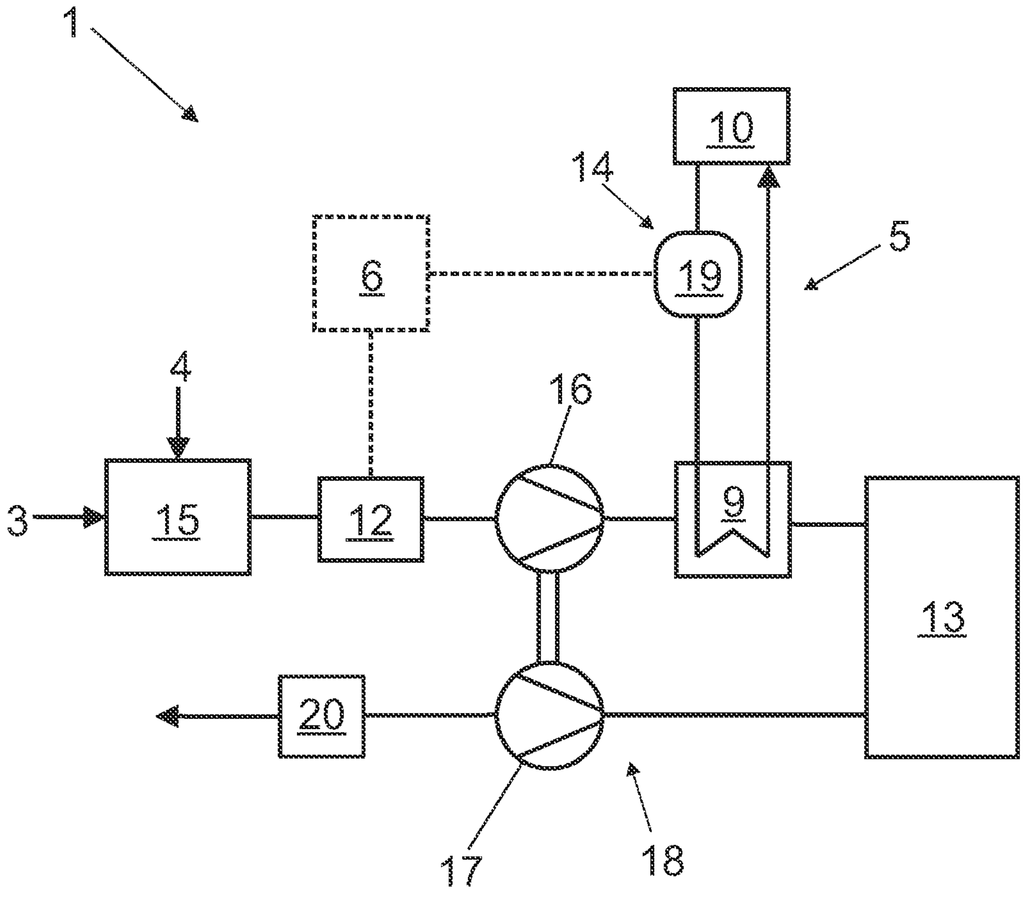
FIG. 1 shows a schematic of an embodiment of a combustion engine proposed.

FIG. 1 shows an embodiment of a combustion engine 1 for combustion of an air-fuel mixture 2 containing air 3 and fuel 4, comprising at least one temperature adjusting means 5 (e.g., temperature adjuster) for cooling or heating the air 3 and/or fuel 4 and/or air-fuel mixture 2 and a control unit 6 (e.g., controller) configured to determine the methane number 7 and/or hydrogen content 8 of the fuel 4 and/or air-fuel mixture 2, wherein the control unit 6 is configured to control a temperature of the air 3 and/or fuel 4 and/or air-fuel mixture 2 based on the determined methane number 7 and/or hydrogen content 8 by controlling the at least one temperature adjusting means 5.

This embodiment of a combustion engine 1 comprises an air-fuel mixing means 15 (e.g., air-fuel mixer), which mixes the air 3 and fuel 4 to an air-fuel mixture 2.

This embodiment comprises at least one sensor 12, which can at least measure the methane number 7 and/or hydrogen content 8 of the fuel 4 and/or air-fuel mixture 2.

This embodiment comprises a turbocharger 18 consisting of a compressor 16 and a turbine 17.

In this embodiment, the at least one temperature adjusting means 5 comprises an intercooler 9 with a fluid circuit 10 and a fluid temperature controller 19, wherein the fluid temperature controller 19 can be controlled to alter the temperature of the temperature adjusting fluid 11.

In respect to this embodiment of a combustion engine 1, firstly, the air 3 and fuel 4 enter the air-fuel mixing means 15; secondly, the air-fuel mixture 2 is measured by the sensor 12, compressed by the compressor 16 and cooled or heated by the temperature adjusting means 5 before the air-fuel mixture 2 enters the at least one combustion chamber 13; then, the exhaust gas leaves the combustion chamber 13, is decompressed by the turbine 17 of the turbocharger 18 and enters an exhaust aftertreatment system 20, e.g., a three-way catalyst, a SCR catalyst or the like, before it leaves the combustion engine 1.

In this embodiment, the control unit 6 of the combustion engine 1 controls the temperature adjusting means 5 by means of the fluid temperature controller 19.

The control unit 6 uses data for the temperature control 14 mechanism, wherein the data is generated by the at least one sensor 12.

Figure 2:
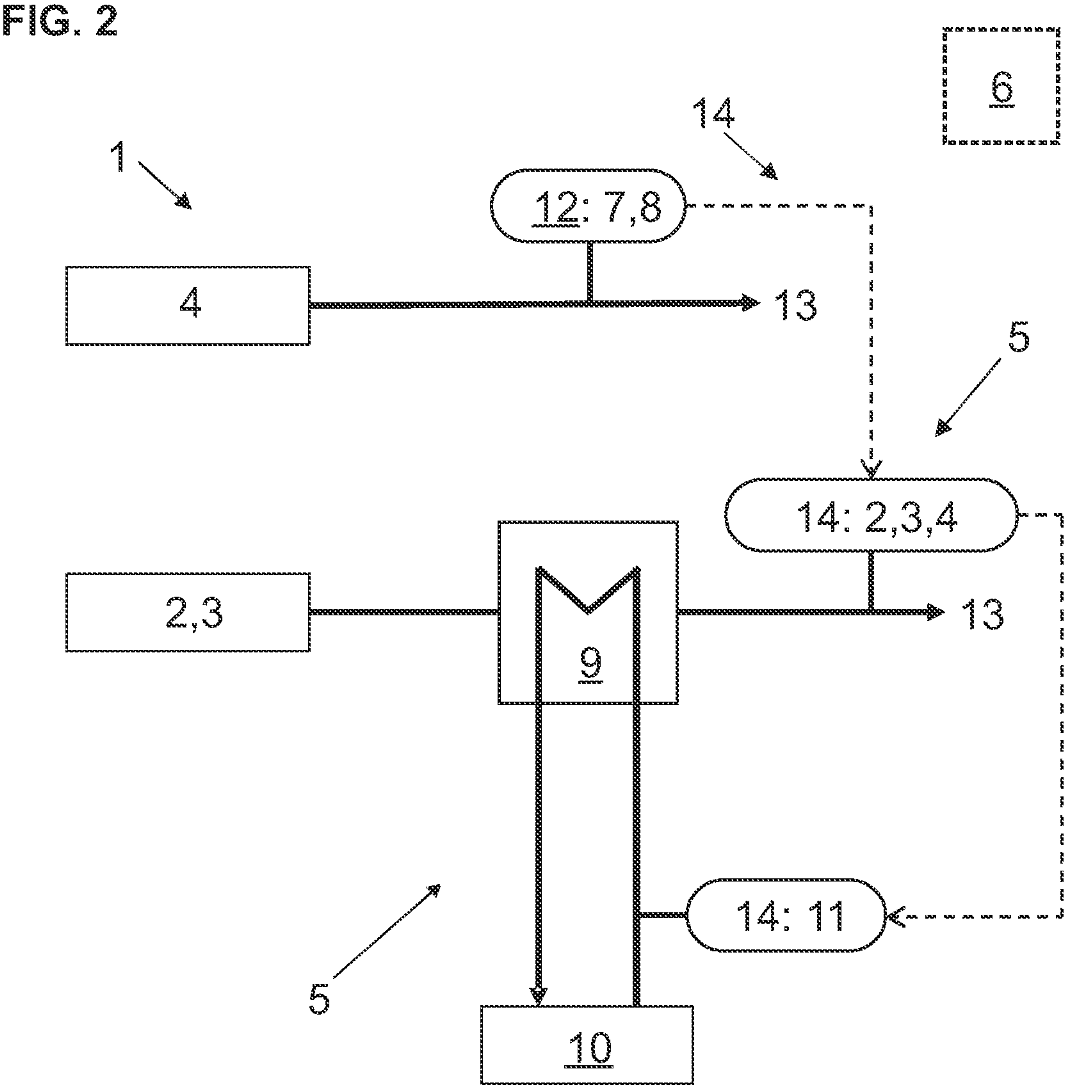
FIGS. 2 and 3 show a first variant of a temperature control mechanism for a combustion engine proposed.
Figure 3:
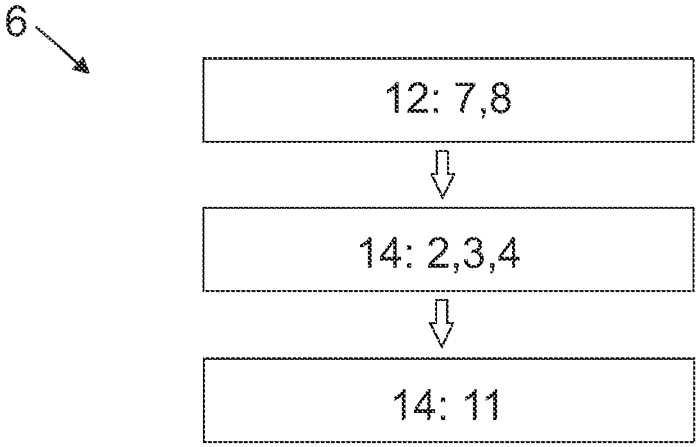

FIGS. 2 and 3 show a first variant of a temperature control 14 mechanism for a combustion engine 1 proposed, wherein FIG. 2 represents the control scheme and FIG. 3 represents the steps that are executed successively to achieve the temperature control 14.

Figure 4:
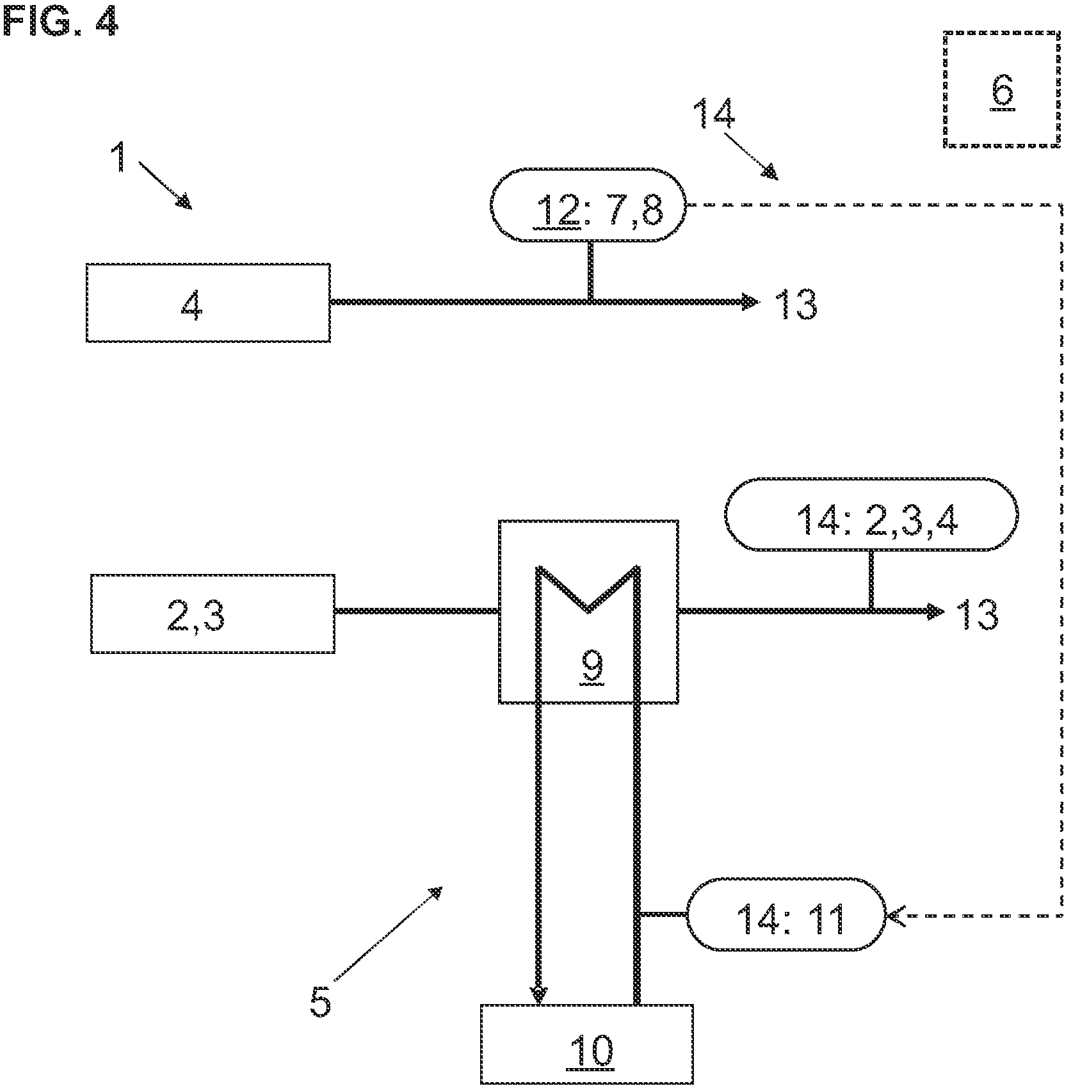
FIGS. 4 and 5 show a second variant of a temperature control mechanism for a combustion engine proposed.

As shown in FIGS. 2 and 4, both variants comprise at least one temperature adjusting means 5 with an intercooler 9 and a fluid circuit 10 with temperature adjusting fluid 11, such as cooling water.

The temperature adjusting means 5 cools or heats the air 3, fuel 4 and/or air-fuel mixture 2 before the air 3, fuel 4 and/or air-fuel mixture 2 enters a combustion chamber 13 of the combustion engine 1. The combustion chamber 13 is not illustrated in FIGS. 2 and 4; the horizontal arrows pointing towards the reference number 13 indicate that the cooled or heated fluid(s) are supplied to the combustion chamber 13

Preferably, the combustion engine 1 comprises multiple temperature adjusting means 5, e.g., two or three intercoolers 9 and/or other temperature adjusting means 5.

If multiple temperature adjusting means 5, particularly multiple intercoolers 9, are used and cooling or heating is performed in stages, it is advantageous to cool or heat the air 3, fuel 4 and/or air-fuel mixture 2 at stages with lower temperatures and/or at the last stage where the temperature of the air 3, fuel 4 and/or air-fuel mixture 2 is the lowest.

Cooling the air 3, fuel 4 and/or air-fuel mixture 2 at the stage with the lowest temperature, the smallest amount of energy is required to achieve the target temperature of the air 3, fuel 4 and/or air-fuel mixture 2 for a present methane number 7 and/or hydrogen content 8.

It is very much preferred that the temperature control 14 is performed in or close to real-time and dependent on the incoming fuel 4 quality.

Preferably, the temperature control 14 mechanism is applied only if required. Preferably, the control unit 6 triggers the temperature control 14 mechanism when the quality of the fuel 4 decreases and/or the engine's operation point moves towards the actual knock resistance.

Decreasing quality of the fuel 4 usually means decreasing methane numbers 4 and/or increasing hydrogen contents 8.

In the first variant, shown in FIGS. 2 and 3, the control unit 6 of the combustion engine 1 is configured to control the temperature of the air 3, fuel 4 and/or air-fuel mixture 2 directly, i.e., by means of direct temperature control 14.

This means that the control unit 6 retrieves the methane number 7 and/or hydrogen content 8 measured by the at least one sensor 12, sets a target temperature of the air 3, fuel 4 and/or air-fuel mixture 2 based on the retrieved methane number 7 and/or hydrogen content 8, and controls the temperature of the temperature adjusting fluid 11 of the temperature adjusting means 5.

The temperature of the temperature adjusting fluid 11 can be controlled via the fluid temperature controller 19, which can comprise at least one mixing valve, radiator, exhauster or the like, and/or by controlling parameters associated with the fluid temperature controller 19, such as rotations of a fan.

Figure 5:
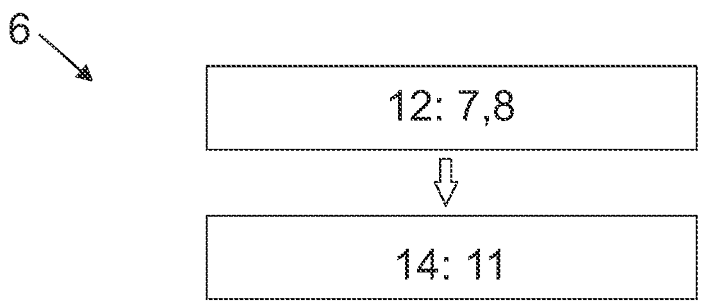

FIGS. 4 and 5 show a second variant of a temperature control 14 mechanism for a combustion engine 1 proposed, wherein FIG. 4 represents the control scheme and FIG. 5 represents the steps that are executed successively to achieve the temperature control 14. The second variant differs from the first variant of FIGS. 2 and 3 in that the control unit 6 is configured to control the temperature adjusting fluid 11 of the temperature adjusting means 5, i.e., by means of indirect temperature control 14.

This means that in the variant shown in FIGS. 4 and 5, the temperature of the air 3, fuel 4 and/or air-fuel mixture 2 is controlled indirectly by means of direct control of the temperature of the temperature adjusting fluid 11, preferably by controlling the fluid temperature controller 19.

This means that the control unit 6 retrieves the methane number 7 and/or hydrogen content 8 measured by the at least one sensor 12, sets a target temperature of the temperature adjusting fluid 11 of the temperature adjusting means 5, and controls the temperature of the temperature adjusting fluid 11 of the temperature adjusting means 5, preferably so that a required or target temperature of the air-fuel mixture 2 inside the combustion chamber 13 can be achieved.

In the schematics, solid lines indicate the flow of the fluids, i.e., air 3, fuel 4 and/or the air-fuel mixture 2; and dashed lines indicate the application of the temperature control 14 mechanism controlled by the control unit 6.

LIST OF REFERENCES

1 combustion engine
2 air-fuel mixture
3 air
4 fuel
5 temperature adjusting means
6 control unit
7 methane number
8 hydrogen content
9 intercooler
10 fluid circuit
11 temperature adjusting fluid
12 sensor
13 combustion chamber
14 temperature control
15 air-fuel mixing means
16 compressor
17 turbine
18 turbocharger
19 fluid temperature controller
20 exhaust aftertreatment system

The invention claimed is:

1. A combustion engine for combustion of an air-fuel mixture containing air and fuel, comprising:
at least one temperature adjuster configured to cool or heat the air, the fuel, and/or the air-fuel mixture; and
a controller configured to obtain a temperature of the air-fuel mixture downstream from mixing of the air and the fuel and upstream from the at least one temperature adjuster, and control the temperature of the air-fuel mixture based on a target knock value versus an actual knock value by controlling the at least one temperature adjuster downstream from compression of the air-fuel mixture and upstream from a combustion chamber of the combustion engine, wherein the target knock value and the actual knock value comprise a knock resistance or a knock probability.

2. The combustion engine of claim 1, comprising:
a mixer configured to mix the air the fuel to obtain the air-fuel mixture;
a sensor configured to sense the temperature of the air-fuel mixture;
a compressor configured to compress the air-fuel mixture downstream from the sensor; and
the at least one temperature adjuster downstream from the compressor, wherein the at least one temperature adjuster comprises at least one intercooler and/or at least one fluid circuit with a temperature adjusting fluid.

3. The combustion engine of claim 1, wherein the controller is configured to shift the actual knock value towards the target knock value via control of the temperature of the fuel and/or the air-fuel mixture by controlling the at least one temperature adjuster.

4. The combustion engine of claim 1, wherein the controller is configured to control the temperature of the fuel and/or the air-fuel mixture so that the combustion engine operates at a constant and/or a full load and/or a rotational speed with the target knock value within a range of 0 to 1.

5. The combustion engine of claim 1, wherein the fuel contains hydrogen and the actual knock value is based at least partially on a hydrogen content of the hydrogen in the fuel and/or the air-fuel mixture.

6. The combustion engine of claim 1, further comprising at least one sensor configured to sense:
a methane number of the fuel and/or air-fuel mixture; and/or
a hydrogen content of the fuel and/or air-fuel mixture; and/or
physical parameters comprising the temperature and/or a humidity of the air, the fuel and/or the air-fuel mixture; and/or
chemical parameters of the air, the fuel and/or the air-fuel mixture; and/or
a composition of the air, the fuel and/or the air-fuel mixture; and/or
a content of an exhaust gas in the air or charge air; and/or knock;
and generates data thereof,
wherein the controller is configured to process the data generated by the at least one sensor to derive at least one quality parameter of the air, the fuel and/or the air-fuel mixture.

7. The combustion engine of claim 1, wherein the controller is configured to control the temperature of the fuel and/or the air-fuel mixture at least partially based on a hydrogen content of the fuel and/or the air-fuel mixture by controlling the at least one temperature adjuster.

8. The combustion engine of claim 1, wherein the controller is configured to control the temperature of the fuel and/or the air-fuel mixture at least partially based on a methane number of the fuel and/or the air-fuel mixture by controlling the at least one temperature adjuster.

9. The combustion engine of claim 1, wherein the combustion engine is a reciprocating engine.

10. The combustion engine of claim 1, comprising a turbocharger comprising a turbine coupled to a compressor, and the at least one temperature adjuster comprises an intercooler disposed between the compressor and a combustion chamber of the combustion engine.

11. The combustion engine of claim 10, comprising at least one sensor coupled to the controller, wherein the at least one sensor is disposed upstream from the compressor.

12. The combustion engine of claim 1, wherein the at least one temperature adjuster comprises a plurality of intercoolers arranged in a plurality of stages, and the controller is configured to control the temperature of the fuel and/or the air-fuel mixture at one of the plurality of stages having a lowest temperature and/or a last stage of the plurality of stages.

13. The combustion engine of claim 1, wherein the controller is configured to selectively increase and decrease the temperature of the fuel and/or the air-fuel mixture in real-time to operate in a knock-free regime or the target knock value in response to variations in fuel quality determined at least by a methane number and/or a hydrogen content.

14. A method for operation of a combustion engine for combustion of an air-fuel mixture containing air and fuel, wherein the method comprises:

determining a target knock value and an actual knock value of the fuel and/or the air-fuel mixture;

obtaining a temperature of the air-fuel mixture downstream from mixing of the air and the fuel and upstream from at least one temperature adjuster; and controlling the temperature of the air-fuel mixture based on the target knock value versus the actual knock value by controlling the at least one temperature adjuster downstream from compression of the air-fuel mixture and upstream from a combustion chamber of the combustion engine, wherein the target knock value and the actual knock value comprise a knock resistance or a knock probability.

15. The method of claim 14, further comprising:

determining the actual knock value of the fuel and/or the air-fuel mixture based on the fuel and/or a methane number and/or a hydrogen content; and calculating the target knock value of the fuel and/or the air-fuel mixture; and determining a target temperature and/or a target temperature difference of the fuel and/or the air-fuel mixture so that the actual knock value equals the target knock value; and controlling the temperature of the fuel and/or the air-fuel mixture by conditioning the fuel and/or the air-fuel mixture to reach the target temperature and/or the target temperature difference using the at least one temperature adjuster.

16. A computer program product for operation of a combustion engine for combustion of an air-fuel mixture containing air and fuel, comprising instructions causing an executing computer to perform the following:

determining a target knock value and an actual knock value of the fuel and/or the air-fuel mixture;

obtaining a temperature of the air-fuel mixture downstream from mixing of the air and the fuel and upstream from at least one temperature adjuster; and outputting control signals to at least one temperature adjuster to control the temperature of the air-fuel mixture based on the target knock value versus the actual knock value downstream from compression of the air-fuel mixture and upstream from a combustion chamber of the combustion engine, wherein the target knock value and the actual knock value comprise a knock resistance or a knock probability.

17. The computer program product of claim 16, wherein the instructions causing an executing computer to furthermore perform the following:

computing and/or using a methane number and/or a hydrogen content of the fuel and/or the air-fuel mixture and/or the combustion engine, and determining the actual knock value based on the fuel and/or the methane number and/or the hydrogen content, and setting the target knock value for the combustion engine, and checking whether the target knock value equals the actual knock value, and if the actual knock value differs from the target knock value, deriving a target temperature and/or temperature difference of the fuel and/or the air-fuel mixture to shift the actual knock value to the target knock value.

18. The method of claim 14, wherein controlling the temperature comprises selectively increasing and decreasing the temperature of the fuel and/or the air-fuel mixture in real-time to operate in a knock-free regime or the target knock value in response to variations in fuel quality determined at least by a methane number and/or a hydrogen content.

19. The computer program product of claim 16, wherein outputting the control signals to control the temperature comprises selectively increasing and decreasing the temperature of the fuel and/or the air-fuel mixture in real-time to operate in a knock-free regime or the target knock value in response to variations in fuel quality determined at least by a methane number and/or a hydrogen content.

20. A combustion engine for combustion of an air-fuel mixture containing air and fuel, comprising:

a mixer configured to mix the air the fuel to obtain the air-fuel mixture;

a sensor configured to sense the temperature of the air-fuel mixture;

a compressor configured to compress the air-fuel mixture downstream from the sensor;

at least one temperature adjuster configured to cool or heat the air, the fuel, and/or the air-fuel mixture, wherein the at least one temperature adjuster is downstream from the compressor, wherein the at least one temperature adjuster comprises at least one intercooler and/or at least one fluid circuit with a temperature adjusting fluid; and a controller configured to control a temperature of the fuel and/or the air-fuel mixture based on a target knock value versus an actual knock value by controlling the at least one temperature adjuster, wherein the target knock value and the actual knock value comprise a knock resistance or a knock probability.

* * * * *